(12) United States Patent
Fruend (10) Patent No.: US 11,544,396 B2
(45) Date of Patent: Jan. 3, 2023

(54) METHOD AND SYSTEM FOR RESTRICTING ACCESS TO AUTOMOTIVE DATA IN A REGULATED AUTOMOTIVE DATA DISTRIBUTION NETWORK

(71) Applicant: OTONOMO TECHNOLOGIES LTD., Even Yehuda (IL)

(72) Inventor: Amir Fruend, Modi'in (IL)

(73) Assignee: OTONOMO TECHNOLOGIES LTD., Even Yehuda (IL)

( * ) Notice: Subject to any disclaimer, the term of this patent is extended or adjusted under 35 U.S.C. 154(b) by 227 days.

(21) Appl. No.: 16/848,040

(22) Filed: Apr. 14, 2020

(65) Prior Publication Data

US 2020/0327246 A1 Oct. 15, 2020

Related U.S. Application Data

(60) Provisional application No. 62/833,704, filed on Apr. 14, 2019.

(51) Int. Cl.
*G06F 21/62* (2013.01)
*G06Q 50/26* (2012.01)
*G06Q 10/10* (2012.01)
*H04L 9/40* (2022.01)

(52) U.S. Cl.
CPC ......... *G06F 21/6218* (2013.01); *G06Q 10/10* (2013.01); *G06Q 50/265* (2013.01); *H04L 63/104* (2013.01)

(58) Field of Classification Search
None
See application file for complete search history.

(56) References Cited

U.S. PATENT DOCUMENTS

| | | | |
|---|---|---|---|
| 2007/0282713 A1* | 12/2007 | Ullman | G06Q 20/203 705/26.1 |
| 2011/0276215 A1* | 11/2011 | Wendling | G07C 5/008 701/1 |
| 2012/0001876 A1* | 1/2012 | Chervenka | G07C 5/00 345/204 |
| 2016/0224028 A1* | 8/2016 | Harvey | G05D 1/0297 |
| 2018/0204470 A1* | 7/2018 | Rezvani | G05D 1/101 |
| 2020/0210896 A1* | 7/2020 | Itzkovich | G06K 9/6262 |

* cited by examiner

*Primary Examiner* — William J. Goodchild
(74) *Attorney, Agent, or Firm* — Pearl Cohen Zedek Latzer Baratz LLP (57) ABSTRACT

A method and a system for restricting access to automotive data in a regulated automotive data distribution network are provided herein. The method may include the following steps: receiving a plurality of automotive data sharing rules from automotive data sharing regulations; receiving data sharing restrictions applicable to at least some of the automotive data; generating a data sharing policy based on the automotive data sharing rules and the data sharing restrictions; and applying the data sharing policy to the automotive data to restrict one or more data consumers from accessing all or portions of the automotive data. The system may implement the steps of the aforementioned method using a regulated data distribution server such as a neutral server for automotive data.

12 Claims, 4 Drawing Sheets

METHOD AND SYSTEM FOR RESTRICTING ACCESS TO AUTOMOTIVE DATA IN A REGULATED AUTOMOTIVE DATA DISTRIBUTION NETWORK

CROSS-REFERENCE TO RELATED APPLICATION

This application claims the benefit of and priority to U.S. Provisional Patent Application No. 62/833,704, filed on Apr. 14, 2019, which is incorporated herein by reference in its entirety and owned by the Assignee of the instant application

FIELD OF THE INVENTION

The present invention relates generally to the field of data processing, and more particularly to processing of automotive data over a computer network.

BACKGROUND OF THE INVENTION

Car makers usually provide data in one feed containing data from different models and years. Currently, there are "standard" policies for authorization of sharing data between the car makers and data consumers.

The car maker may define white lists, blacklists, and/or sets of rules to approve data consumers. The car maker may request each data consumer is individually approved. These restrictions are typically applied to a full data feed from the particular car maker. The aforementioned process can be performed prior to enabling a particular data consumer to get a particular data feed.

In Europe, as part of the Neutral Server regulation, car makers are currently required to share their data with Tier1 suppliers and/or automotive subsystem manufactures. Similar regulations are being contemplated in the United States. Such data can include performance information, detected error codes, sub-system failure information, and/or additional data as defined in the regulations. Usually car makers have more than one Tier1 supplier of the same sub system, thus resulting in a car maker typically having to share data with multiple entities.

The data collected from vehicles can be business sensitive. Different car models can have different Tier1 suppliers, in some scenarios, even for the same car part. Tier1 suppliers can compete with each other, which can result in the data collected from the vehicles being highly business sensitive. Therefore, the Neutral Server regulation regime can require a data feed access authorization solution that is can account for data sharing among multiple businesses and competitors. This can be enhanced in comparison to the types of solutions that are currently in use.

SUMMARY OF THE INVENTION

In one aspect, the invention involves a computer-implemented method for restricting access to automotive data within a regulated automotive data distribution network. The method involves receiving a plurality of data sharing rules from automotive data sharing regulations, receiving data sharing restrictions applicable to at least some of the automotive data, generating a data sharing policy based on said data sharing rules and said data sharing restrictions, and, applying said data sharing policy to said automotive data to restrict one or more data consumers from accessing all or portions of said automotive data.

In another aspect, the invention includes a data processing system for restricting access to automotive data within a regulated automotive data distribution network. The system includes an automotive data distribution server having a policy generator configured to receive a plurality of data sharing rules from automotive data sharing regulations receive data sharing restrictions applicable to at least some of the automotive data, and generate a data sharing policy based on said data sharing rules and said data sharing restrictions. The automotive data distribution server also having a data sharing restrictor configured to apply the data sharing policy to said automotive data to restrict one or more data consumers from accessing all or portions of the automotive data.

In another aspect, the invention includes a non-transitory computer readable storage medium for restricting access to automotive data within a regulated automotive data distribution network. The computer readable storage medium includes a set of instructions that when executed cause at least one computer processor to obtain a plurality of data sharing rules from automotive data sharing regulations; obtain data sharing restrictions applicable to at least some of the automotive data, generate a data sharing policy based on said automotive data sharing rules and said data sharing restrictions, and, apply said data sharing policy to said automotive data to restrict one or more data consumers from accessing all or portions of said automotive data.

Advantageously, some embodiments of the present invention allow the definition of policy rules that are applicable, for example to: make, model, year of the car and the like.

Advantageously, some embodiments of the present invention enable to associate different set of attributes with different Tier1 data consumers.

Advantageously, some embodiments of the present invention the whole filtering policy may be performed in real time per each data point received from the car maker, before sending it to the Tier1.

Further advantages of the present invention are set forth in detail in the following description.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF THE INVENTION

In the following description, various aspects of the present invention will be described. For purposes of explanation, specific configurations and details are set forth in order to provide a thorough understanding of the present invention. However, it will also be apparent to one skilled in the art that the present invention may be practiced without the specific details presented herein. Furthermore, well known features may be omitted or simplified in order not to obscure the present invention.

Unless specifically stated otherwise, as apparent from the following discussions, it is appreciated that throughout the specification discussions utilizing terms such as "processing", "computing", "calculating", "determining" and the like, refer to the action and/or processes of a computer or computing system, or similar electronic computing device, that manipulates and/or transforms data represented as physical, such as electronic, quantities within the computing system's registers and/or memories into other data similarly represented as physical quantities within the computing system's memories, registers or other such information storage, transmission or display devices.

According to some embodiments of the present invention, a connected vehicle may include any vehicle that has been equipped with wireless networking connectivity. These vehicles may include a car, drone, aerial vehicle, or any other vehicle as known in the art. Each connected vehicle may further have one or more discrete or interconnected sensing devices, such as an accelerometer, gyroscope, global positioning locator, or the like, configured to collect data relating to the connected vehicle and/or its surroundings. Data originating from connected vehicles and/or infrastructure may be wirelessly transmitted and exchanged with other connected vehicles, thereby resulting in the proliferation of automotive data and enabling various third-party services, such as insurance premium tailoring and/or traffic congestion avoidance.

According to some embodiments of the present invention, the neutral server is a regulatory initiative instigated by automotive industry organizations throughout Europe. A neutral server acts typically as an automotive data repository (e.g., a networked server) and facilitates the sharing of automotive data collected from connected vehicles, roadbound infrastructure, and the like. Pursuant to stipulated regulatory requirements, each neutral server must be operated and financed by an independent party (e.g., a party without obligations or business interests within the automotive sector). Other regulatory requirements may also apply.

According to some embodiments of the present invention, data sharing rules may include a set of regulatory parameters, for example such as those stipulated by relevant legislative authorities (e.g., "automotive data sharing regulations", such as the GDPR), that govern the manner in which data, and in particular automotive data, must be handled, stored and shared.

According to some embodiments of the present invention, data sharing restrictions refer generally to limitations and restrictions placed upon whether any given third-party has rights of access to a particular piece or subset of automotive data. Such access rights may be obtained by virtue of, for example, explicit authorization from the data originator, purchased data ownership rights, or the like. Restrictions may be applicable in circumstances where, for example, it is necessary to exclude one or more data consumers from unfettered access to automotive data to ensure that valuable competitor data (e.g., the lifespan of a particular automotive component) is not erroneously shared.

When a data consumer requests the sharing of aggregate data from a specific fleet or an original equipment manufacturer (OEM), the data consumer does not know in advance which vehicles will be included. If this data consumer is a Tier1 that can only see information from vehicles which have an engine control unit (ECU) made by that Tier1, then this should be decided in real time as the data flows.

The criteria for this will be at a format of: vehicle make/model/year, together with a table that associates to this the list of ECU's and their Tier1's. For example, it can be desirable for Tier1 suppliers to receive data only (or substantially only) from vehicles having parts that a particular Tier1 supplier installed, such that each Tier1 supplier receives only the attributes (or substantially only attributes) that are relevant for their particular sub-system. In most cases, the policy rules will have to be applied on a per vehicle basis and in real-time based on the vehicle data that flows in.

There are however also drawbacks to exchanging data between entities, for example, where the particular automotive data is business sensitive and/or confidential. In some scenarios, various legislative bodies have implemented data sharing regulations, for example the General Data Protection Regulation ("GDPR") attempts to limit and/or prevent unauthorized access to sensitive and/or confidential automotive data. For example, under the GDPR data originators (e.g., car owners/drivers) have been empowered with rights to decide upon with whom their personal automotive data are shared, and to stipulate the purposes for which that access is allowed.

Another initiative that has been proposed in the automotive sector to enable third-party service providers to access automotive data while simultaneously safeguarding the data rights of users and businesses is the so-called automotive "neutral server" which is a server that acts as a limited access repository for automotive data and is operated and financed by an entirely independent party (e.g., a party with little or no obligations and/or business interests in the automotive sector). Interested third-parties (e.g., service providers) may accordingly access automotive data through neutral servers typically without an individual contractual agreement with the data originator, provided that the relevant approval has been pre-signed by the data originator prior to being accessible through the neutral servers.

Certain undesirable situations involving neutral servers have however arisen owing to improperly defined rulesets governing automotive data access. For example, vehicle parts manufacturers have in some circumstances been able to access sensitive competitor data by requesting automotive data pertaining to vehicle models they have historically contributed to, yet no longer do so. Therefore, it can be desirable selectively restrict third-party access to automotive data within a regulated automotive data distribution network.

Figure 1:
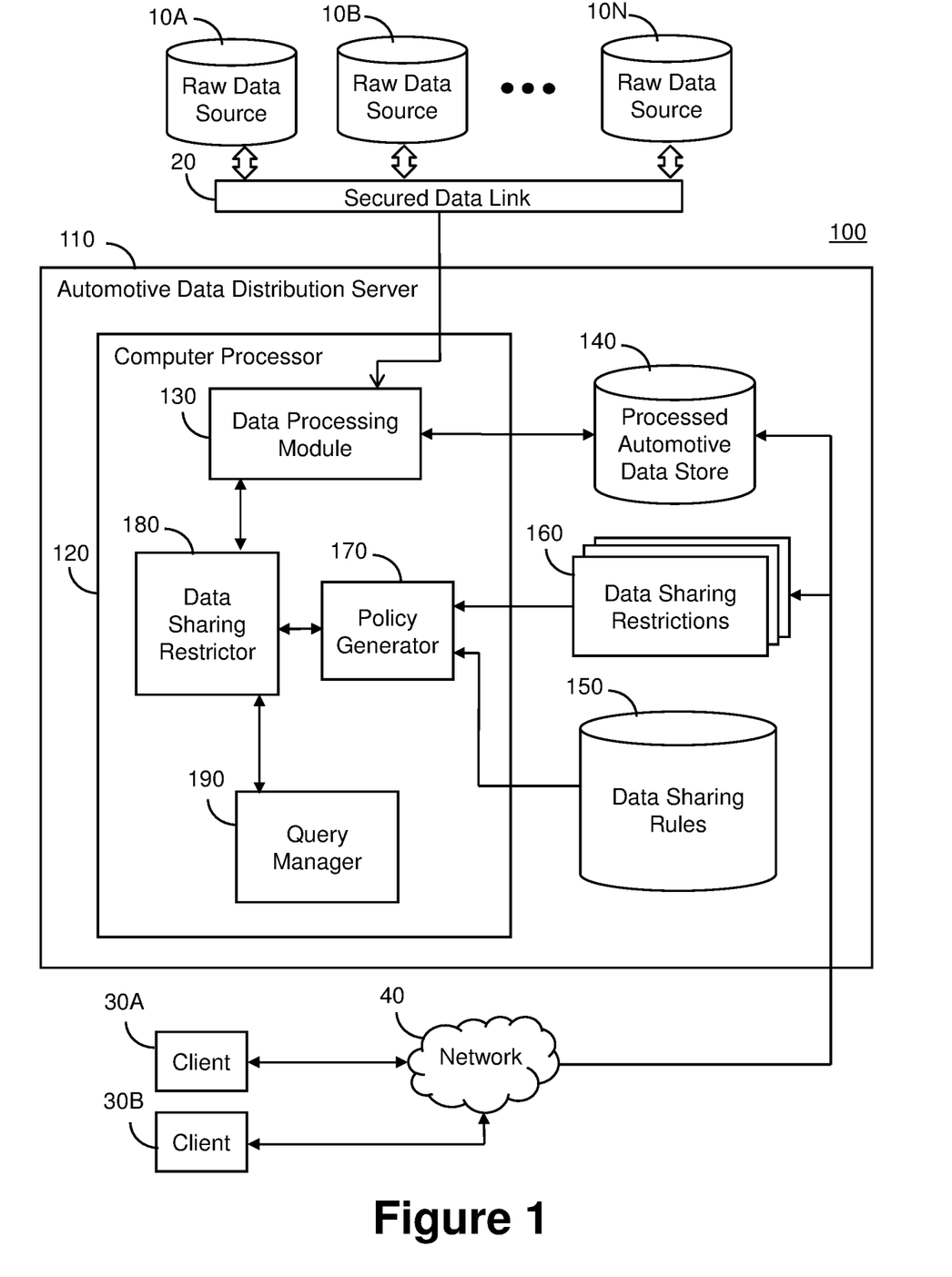
FIG. 1 is a block diagram illustrating non-limiting exemplary architecture of a regulated automotive data distribution network in accordance with embodiments of the present invention.

FIG. 1 is a block diagram illustrating non-limiting architecture of a regulated automotive data distribution network 100 in accordance with embodiments of the present invention. Automotive data distribution network 100 includes at least one automotive data distribution server 110 which may, in some embodiments, be compliant with neutral server regulations.

Automotive data distribution server 110 may be connected, for example via secured wireless data link 20, to a plurality of automotive data sources 10A-10N (e.g., raw data sources). As will be appreciated by those skilled in the art, each automotive data source 10A-10N may be a connected vehicle (having, for example, one or more sensing devices), road-bound infrastructure (e.g., a traffic camera, weather station, or the like) and/or a remote data repository (e.g., a third-party database, such as one comprising a list of vehicle models having certain vehicle parts). Automotive data distribution server 110 may be further connected, for example via wireless connection to network 40, with one or more clients 30A-30B. A data processing module 130 runs on computer processor 120 may also be included within automotive data distribution server 110. Data processing module 130 may be configured, when operated by computer processor 120, to anonymize, and/or normalize, automotive data obtained from automotive data sources 10A-10N. Data processing module 130 can store said anonymized automotive data within a processed automotive data store 140 (e.g., a computer disk drive, or the like). Processed (e.g., pre-anonymized) automotive data originating from clients 30A-30B may also be transmitted directly to and/or stored within, processed automotive data store 140.

In some embodiments, automotive data distribution server 110 includes a policy generator 170 runs on computer processor 120. Policy generator 170 may be configured to obtain and/or derive a plurality of automotive data sharing rules 150 from applicable automotive data sharing regulations. The data sharing regulations are applicable to all data stored on processed automotive data store 140. The data sharing regulations may vary significantly, e.g., depending on the jurisdiction (e.g., Europe or the United States) within which the automotive data distribution server 110 is operated and/or utilized. Policy generator 170 may be further configured to obtain data sharing restrictions applicable to at least some portion (e.g., a subset) of the automotive data stored on processed automotive data store 140. In some embodiments, these data sharing restrictions may be provided directly from clients 30A-30B via network 40, for example in the form of disclaimer revoking data access to one or more data consumers. Accordingly, unlike data sharing rules 150, data sharing restrictions 160 are applicable only to certain data consumers and may arise in circumstances where it is necessary to, for example, safeguard the privacy rights of one or more clients 30A-30B and/or automotive data sources 10A-10N.

Following receipt of applicable data sharing rules 150 and data sharing restrictions 160, policy generator 170 may generate a corresponding data sharing policy. According to preferred embodiments of the invention, automotive data distribution server 110 may further include a data sharing restrictor 180 operable, by computer processor 120, to apply the data sharing policy, as derived from data sharing rules 150 and data sharing restrictions 160, to any automotive data accessed by data processing module 130 from processed automotive data store 140.

Figure 2:
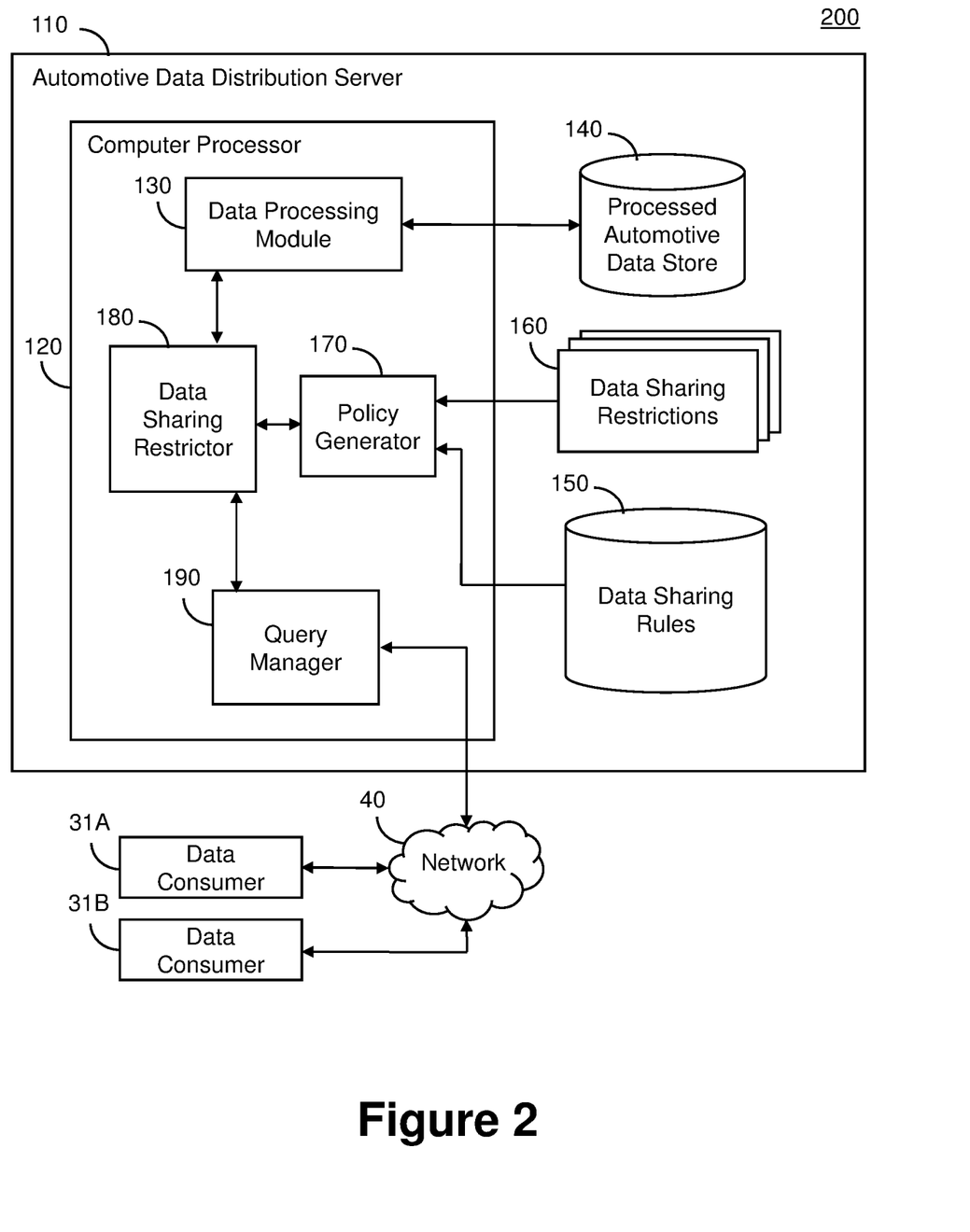
FIG. 2 is a block diagram illustrating non-limiting exemplary architecture of a regulated automotive data distribution network in accordance with embodiments of the present invention.

FIG. 2 is a block diagram illustrating non-limiting exemplary architecture of a regulated automotive data distribution network 200 in accordance with embodiments of the present invention. Automotive data distribution server 110 can receive a request from one or more data consumers 31A-31B, via network 40, to receive access to desired portions or subsets of automotive data. Automotive data access requests from data consumers 31A-31B may be received by query manager 190 and actioned, by computer processor 120, in accordance with the data sharing policy implemented by data sharing restrictor 180. In the event that the data consumers 31A-31B are permitted, according to the data sharing policy, to access some or all of the requested automotive data, data processing module 130 retrieves the permitted automotive data from processed automotive data store 140 and provides it (e.g., transmit it wirelessly) to the data consumer 31A-31B, via network 40. In the event that the data consumers 31A-31B are not permitted to access the requested automotive data, a refusal message and/or notification may be issued. In some embodiments, the message or notification includes a basis for the refusal (e.g., which aspect of the data sharing rules 150 or data sharing restrictions 160 are contravened by the automotive data access request).

The aforedescribed regulated automotive data distribution network 100 according to embodiments of the present invention can confer numerous advantages over the existing state of the art. As is known in the art, in order to comply with neutral server standards, vehicle manufacturers are typically required to only define data attributes to be shared from their data centers with various third-parties (e.g., so-called "Tier 1" manufacturers, which may be competitors) and/or other data consumers. The vehicle manufacturer may not be allowed, e.g., according to legislative provisions, to know which entities (e.g., data consumers and/or third-parties) are consuming their data, nor the purposes for which that data has been acquired. The vehicle manufacturer therefore only has control over which categories of data attributes they permit to being shared, not who ultimately accesses this data.

This can be highly disadvantageous, and circumstances have arisen where manufacturers have been permitted to consume data containing critical information about their competitors. By way of non-limiting illustrative example, the following situation is proposed: a vehicle manufacturer produces and sells vehicle models 1, 2, and 3 using a specific engine control unit ("ECU") manufactured by company "A". The same vehicle manufacturer also produces and sells vehicle models 4, 5, and 6 using a different, but otherwise similar, ECU manufacturer by company "B".

Continuing with the above example, the vehicle manufacturer, as part of their agreement with a neutral server, provides and shares various automotive data collected from ECU's in each of their vehicle models (e.g., each of models 1-6). The vehicle manufacturer is however is not made aware of which data consumers request access their data. The vehicle manufacturer also has no control over how their data is shared, nor the purposes for which it is shared. Accordingly, it may possible for company "A" to request and consume data relating to vehicle models 4, 5 and 6 (e.g., the vehicle models company "A" did not contribute to) without the vehicle manufacturer being made aware, thereby creating an undesirable situation where company "A" is able to obtain competitive knowledge about the performance of the ECU manufactured by their direct competitor, company "B".

The aforedescribed regulated automotive data distribution network 100 according to embodiments of the invention can obviate the inadvertent sharing of data by allowing data originators, such as the vehicle manufacturer in this example, to place data sharing restrictions upon their automotive data. These data sharing restrictions can be implemented, utilizing a data sharing restrictor (e.g., data sharing restrictor 180 as described above in FIG. 1), to, for example, ensure that business sensitive automotive data is not consumed by parties other than those permitted access by the data originator. In some embodiments, data consumers that are not precluded access, for example because they have no business interests in the respective sector (e.g., they are not a direct competitor), may still obtain unfettered access to the same automotive data owing to the selective nature of the imposed data sharing restrictions.

To further illustrate these advantages, reference is made to Table 1 below. Table 1 is a non-limiting exemplary policy table that has been generated by embodiments of the present invention in order to balance data sharing requirement (addressing fairness of data sharing) on one hand, and the data sharing restrictions (addressing the protection of legitimate business interest of competing data consumers) on the other hand.

According to some embodiments of the present invention, the policy table governs, for a specific vehicle manufacture, the data sharing restrictions applied to a specific type of automotive data (in this example, Anti-lock Braking System (ABS) data compiled by ECUs in vehicle models 1-6). As one may observe, several Tier 1 companies (e.g., data consumers) have their access to subsets of ABS data restricted to specific years of manufacture. These restrictions are in place to ensure that business sensitive automotive data pertaining to ABS systems manufactured by company "A" and utilized in vehicle models 1-3 may not be accessed by company "B", and vice versa. This may be guaranteed, for example, by verifying (e.g. based on data originating from the vehicle manufacturer) that vehicle models 1, 2, and 3 manufactured between the years of 2010 and 2012 do not contain ABS systems other than those manufactured by company "A".

Conversely, when the data consumer is a third-party service provider with no immediate commercial interest in the manufacturing sector, such as safety application "BrakeSafe" (e.g., not an ABS system manufacturer), the data sharing policy may be much more flexible and permit access to automotive data for each of vehicle models 1-6 throughout each of years 2010-2018.

Car Maker: Company 1
Category: Anti-lock Braking System (ABS) ECU Information
Attributes: ABS Lock, ABS Diagnostic Trouble Code (DTC) error codes, ABS Heat, ABS friction statistics.

TABLE 1

| Policy Rule | Vehicle Model | Years | Approved Tier1's/Data Consumers |
|---|---|---|---|
| 1 | 1, 2, and 3 | 2010-2012 | Tier 1 company "A" |
| 2 | 4, 5, and 6 | 2013-2018 | Tier 1 company "B" |
| . . . | . . . | . . . | . . . |
| 56 | 1, 2, 3, 4, 5, and 6 | 2010-2018 | Safety application "BrakeSafe" |

According to some embodiments of the present invention, the automotive data sharing regulations may include neutral server regulations, and wherein the regulated automotive data distribution server is a neutral server.

According to some embodiments of the present invention, the data sharing restrictions are obtained and derived from data submitted by one or more data originators.

According to some embodiments of the present invention, the automotive data sharing regulations may include legislation or legal provisions.

According to some embodiments of the invention, the automotive data may comprise data originating from one or more of: connected vehicles, road-bound infrastructure, and remove data repositories.

According to some embodiments of the invention, the data sharing restrictions may be provided by tables.

According to some embodiments of the present invention, the tables associate at least one of: automotive data attributes, vehicle models, and vehicles manufacturing years with approved data consumers.

According to some embodiments of the present invention, the approved data consumers comprise at least one of: Tier 1 manufacturer; and automotive data service provider, and wherein an approval of the data consumers is obtained from a respective vehicle manufacturer.

According to some embodiments of the present invention, a masking mechanism may be used in order to implement the generation of a data sharing policy (e.g. the aforementioned Table 1) based on data sharing rules (e.g. rules that requires automotive data marketplace to share their data) and the data sharing restrictions (e.g. restrictions derived from provisions between OEMs and Tier1s addressing the business interest of the parties).

According to some embodiments of the present invention, the masking mechanism may determine what type of data is allowed to be shared with a specific data consumer. The mask can be of the form of: DATA TYPE/OEM/MODEL/YEAR/TIER1

Thus, an exemplary mask that is applied to can take the following form:

```
engine-stat BMW-X5-2019 Bosch
engine-stat BMW-X3-2020 Conti
engine-stat BMW-X2-2018 *
speed * *
acceleration * *
``` where * denotes "all" acceptable values in a certain field.

The aforementioned mask may read: "Engine statistics coming from a BMW car model X5 of registration year 2019 are only allowed to be shared with Bosch; Engine statistics coming from a BMW car model X3 of registration year 2020 are only allowed to be shared with Conti; Engine statistics coming from a BMW car model X2 of registration year 2018 are only allowed to be shared with all Tier1s; Speed and acceleration data of all OEMs of all models and of all registration years are allowed to be shared with all Tier1s.

Figure 3:
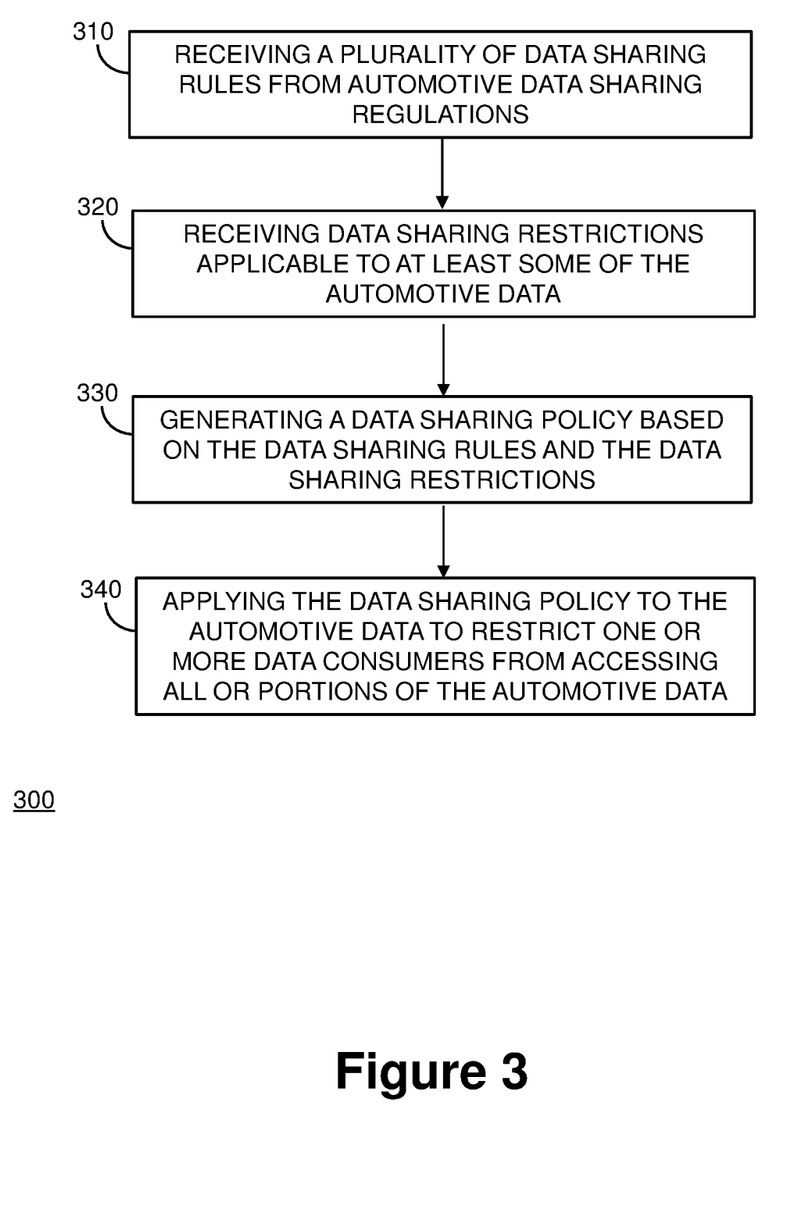
FIG. 3 is a high-level flowchart illustrating a non-limiting exemplary computer-implemented method in accordance with embodiments of the present invention.

FIG. 3 is a high-level flowchart illustrating a method 300 in accordance with some embodiments of the present invention. Method 300 can include receiving a plurality of data sharing rules from automotive data sharing regulations (Step 310). This step basically complies with the neutral server requirements (or equivalent) which requires the sharing of data without bias or discrimination.

The method also involves receiving data sharing restrictions applicable to at least some of the automotive data (Step 320).

The method further involves generating a data sharing policy based on said data sharing rules and said data sharing restrictions (Step 330). This is achieved by creating a table which maps the access per sensor-make/model. This can be done using fetching the data from dedicated databases, mining this data from open resources in the internet and the like.

The method also involves applying said data sharing policy to the automotive data to restrict one or more data consumers from accessing all or portions of said automotive data (Step 340). This is achieved by creating a table which maps the access per sensor-make/model. This can be done using fetching this data from dedicated databases, mining this data from open resources in the internet and the like.

Figure 4:
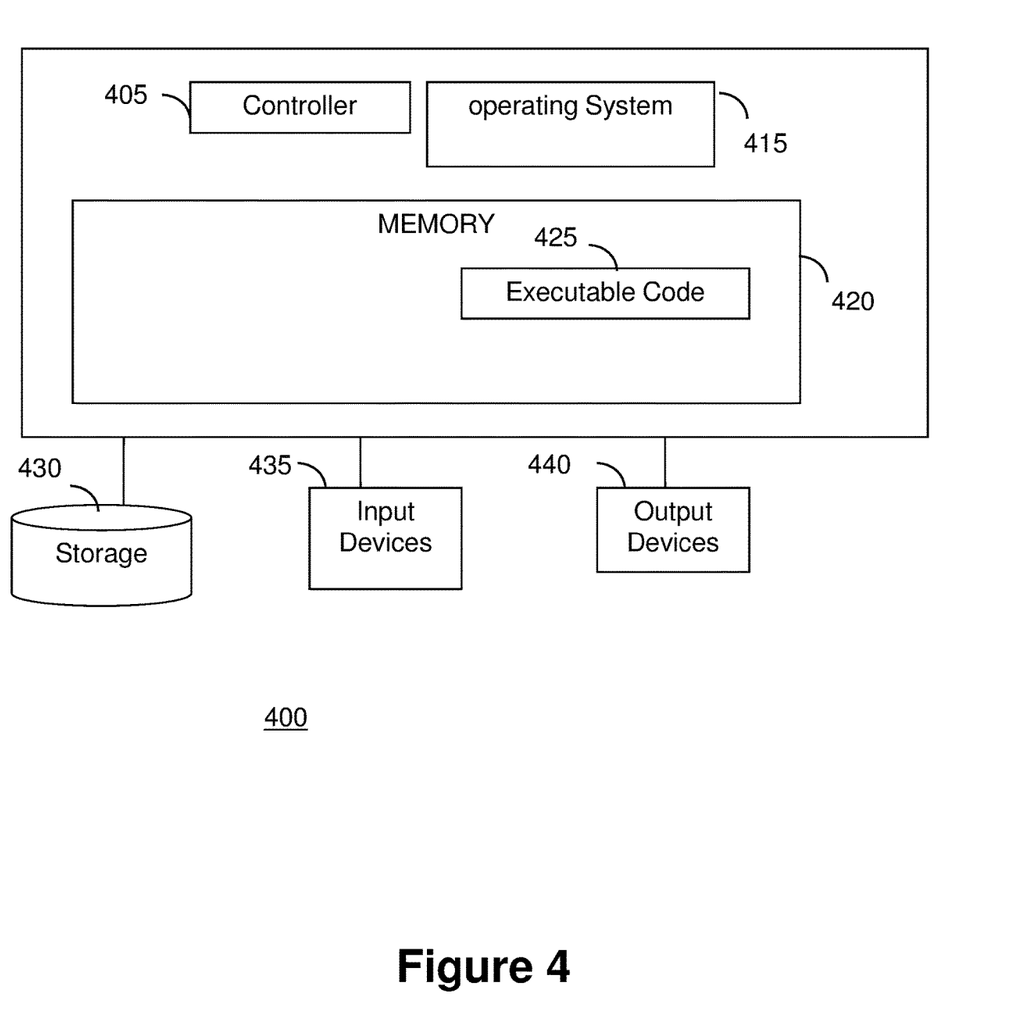
FIG. 4 is a block diagram illustrating non-limiting exemplary architecture of a networked server that runs on one more computer processors in accordance with some embodiments of the present invention.

FIG. 4 is a block diagram illustrating non-limiting exemplary architecture of an online automotive data marketplace that complies with the neutral server requirements and runs on one more computer processors in accordance with some embodiments of the present invention.

In accordance with some embodiments of the present invention, the online automotive data marketplace may be presented as a Computing device 400 which can be used with embodiments of the invention. Computing device 400 can include a controller or processor 405 that can be or include, for example, one or more central processing unit processor(s) (CPU), one or more Graphics Processing Unit(s) (GPU or GPGPU), a chip or any suitable computing or computational device, an operating system 415, a memory 420, a storage 430, input devices 435 and output devices 440.

Operating system 415 can be or can include any code segment designed and/or configured to perform tasks involving coordination, scheduling, arbitration, supervising, controlling or otherwise managing operation of computing device 400, for example, scheduling execution of programs. Memory 420 can be or can include, for example, a Random Access Memory (RAM), a read only memory (ROM), a Dynamic RAM (DRAM), a Synchronous DRAM (SD-RAM), a double data rate (DDR) memory chip, a Flash memory, a volatile memory, a non-volatile memory, a cache memory, a buffer, a short term memory unit, a long term memory unit, or other suitable memory units or storage units. Memory 420 can be or can include a plurality of, possibly different memory units. Memory 420 can store for example, instructions to carry out a method (e.g. code 425), and/or data such as user responses, interruptions, etc.

Executable code 425 can be any executable code, e.g., an application, a program, a process, task or script. Executable code 425 can be executed by controller 405 possibly under control of operating system 415. For example, executable code 425 can when executed cause masking of personally identifiable information (PII), according to embodiments of the invention. In some embodiments, more than one computing device 400 or components of device 400 can be used for multiple functions described herein. For the various modules and functions described herein, one or more computing devices 400 or components of computing device 400 can be used. Devices that include components similar or different to those included in computing device 400 can be used, and can be connected to a network and used as a system. One or more processor(s) 405 can be configured to carry out embodiments of the invention by for example executing software or code. Storage 330 can be or can include, for example, a hard disk drive, a Compact Disk (CD) drive, a CD-Recordable (CD-R) drive, a universal serial bus (USB) device or other suitable removable and/or fixed storage unit. Data such as instructions, code, NN model data, parameters, etc. can be stored in a storage 430 and can be loaded from storage 430 into a memory 420 where it can be processed by controller 405.

Input devices 435 can be or can include for example a mouse, a keyboard, a touch screen or pad or any suitable input device. It will be recognized that any suitable number of input devices can be operatively connected to computing device 400 as shown by block 435. Output devices 440 can include one or more displays, speakers and/or any other suitable output devices. It will be recognized that any suitable number of output devices can be operatively connected to computing device 400 as shown by block 440. Any applicable input/output (I/O) devices can be connected to computing device 400, for example, a wired or wireless network interface card (NIC), a modem, printer or facsimile machine, a universal serial bus (USB) device or external hard drive can be included in input devices 435 and/or output devices 440.

Embodiments of the invention can include one or more article(s) (e.g. memory 420 or storage 430) such as a computer or processor non-transitory readable medium, or a computer or processor non-transitory storage medium, such as for example a memory, a disk drive, or a USB flash memory, encoding, including or storing instructions, e.g., computer-executable instructions, which, when executed by a processor or controller, carry out methods disclosed herein.

One skilled in the art will realize the invention can be embodied in other specific forms without departing from the spirit or essential characteristics thereof. The foregoing embodiments are therefore to be considered in all respects illustrative rather than limiting of the invention described herein. Scope of the invention is thus indicated by the appended claims, rather than by the foregoing description, and all changes that come within the meaning and range of equivalency of the claims are therefore intended to be embraced therein.

In the foregoing detailed description, numerous specific details are set forth in order to provide an understanding of the invention. However, it will be understood by those skilled in the art that the invention can be practiced without these specific details. In other instances, well-known methods, procedures, and components, modules, units and/or circuits have not been described in detail so as not to obscure the invention. Some features or elements described with respect to one embodiment can be combined with features or elements described with respect to other embodiments.

Although embodiments of the invention are not limited in this regard, discussions utilizing terms such as, for example, "processing," "computing," "calculating," "determining," "establishing", "analyzing", "checking", or the like, can refer to operation(s) and/or process(es) of a computer, a computing platform, a computing system, or other electronic computing device, that manipulates and/or transforms data represented as physical (e.g., electronic) quantities within the computer's registers and/or memories into other data similarly represented as physical quantities within the computer's registers and/or memories or other information non-transitory storage medium that can store instructions to perform operations and/or processes.

Although embodiments of the invention are not limited in this regard, the terms "plurality" and "a plurality" as used herein can include, for example, "multiple" or "two or more". The terms "plurality" or "a plurality" can be used throughout the specification to describe two or more components, devices, elements, units, parameters, or the like. The term set when used herein can include one or more items. Unless explicitly stated, the method embodiments described herein are not constrained to a particular order or sequence. Additionally, some of the described method embodiments or elements thereof can occur or be performed simultaneously, at the same point in time, or concurrently.

A computer program can be written in any form of programming language, including compiled and/or interpreted languages, and the computer program can be deployed in any form, including as a stand-alone program or as a subroutine, element, and/or other unit suitable for use in a computing environment. A computer program can be deployed to be executed on one computer or on multiple computers at one site.

Method steps can be performed by one or more programmable processors executing a computer program to perform functions of the invention by operating on input data and generating output. Method steps can also be performed by an apparatus and can be implemented as special purpose logic circuitry. The circuitry can, for example, be a FPGA (field programmable gate array) and/or an ASIC (application-specific integrated circuit). Modules, subroutines, and software agents can refer to portions of the computer program, the processor, the special circuitry, software, and/or hardware that implement that functionality.

Processors suitable for the execution of a computer program include, by way of example, both general and special purpose microprocessors, and any one or more processors of any kind of digital computer. Generally, a processor receives instructions and data from a read-only memory or a random access memory or both. The essential elements of a computer are a processor for executing instructions and one or more memory devices for storing instructions and data. Generally, a computer can be operatively coupled to receive data from and/or transfer data to one or more mass storage devices for storing data (e.g., magnetic, magneto-optical disks, or optical disks).

Data transmission and instructions can also occur over a communications network. Information carriers suitable for embodying computer program instructions and data include all forms of non-volatile memory, including by way of example semiconductor memory devices. The information carriers can, for example, be EPROM, EEPROM, flash memory devices, magnetic disks, internal hard disks, removable disks, magneto-optical disks, CD-ROM, and/or DVD-ROM disks. The processor and the memory can be supplemented by, and/or incorporated in special purpose logic circuitry.

To provide for interaction with a user, the above described techniques can be implemented on a computer having a display device, a transmitting device, and/or a computing device. The display device can be, for example, a cathode ray tube (CRT) and/or a liquid crystal display (LCD) monitor. The interaction with a user can be, for example, a display of information to the user and a keyboard and a pointing device (e.g., a mouse or a trackball) by which the user can provide input to the computer (e.g., interact with a user interface element). Other kinds of devices can be used to provide for interaction with a user. Other devices can be, for example, feedback provided to the user in any form of sensory feedback (e.g., visual feedback, auditory feedback, or tactile feedback). Input from the user can be, for example, received in any form, including acoustic, speech, and/or tactile input.

The computing device can include, for example, a computer, a computer with a browser device, a telephone, an IP phone, a mobile device (e.g., cellular phone, personal digital assistant (PDA) device, laptop computer, electronic mail device), and/or other communication devices. The computing device can be, for example, one or more computer servers. The computer servers can be, for example, part of a server farm. The browser device includes, for example, a computer (e.g., desktop computer, laptop computer, and tablet) with a World Wide Web browser (e.g., Microsoft® Internet Explorer® available from Microsoft Corporation, Chrome available from Google, Mozilla® Firefox available from Mozilla Corporation, Safari available from Apple). The mobile computing device includes, for example, a personal digital assistant (PDA).

Website and/or web pages can be provided, for example, through a network (e.g., Internet) using a web server. The web server can be, for example, a computer with a server module (e.g., Microsoft® Internet Information Services available from Microsoft Corporation, Apache Web Server available from Apache Software Foundation, Apache Tomcat Web Server available from Apache Software Foundation).

The storage module can be, for example, a random access memory (RAM) module, a read only memory (ROM) module, a computer hard drive, a memory card (e.g., universal serial bus (USB) flash drive, a secure digital (SD) flash card), a floppy disk, and/or any other data storage device. Information stored on a storage module can be maintained, for example, in a database (e.g., relational database system, flat database system) and/or any other logical information storage mechanism.

The above-described techniques can be implemented in a distributed computing system that includes a back-end component. The back-end component can, for example, be a data server, a middleware component, and/or an application server. The above described techniques can be implemented in a distributing computing system that includes a front-end component. The front-end component can, for example, be a client computer having a graphical user interface, a Web browser through which a user can interact with an example implementation, and/or other graphical user interfaces for a transmitting device. The components of the system can be interconnected by any form or medium of digital data communication (e.g., a communication network). Examples of communication networks include a local area network (LAN), a wide area network (WAN), the Internet, wired networks, and/or wireless networks.

The system can include clients and servers. A client and a server are generally remote from each other and typically interact through a communication network. The relationship of client and server arises by virtue of computer programs running on the respective computers and having a client-server relationship to each other.

The above described networks can be implemented in a packet-based network, a circuit-based network, and/or a combination of a packet-based network and a circuit-based network. Packet-based networks can include, for example, the Internet, a carrier internet protocol (IP) network (e.g., local area network (LAN), wide area network (WAN), campus area network (CAN), metropolitan area network (MAN), home area network (HAN), a private IP network, an IP private branch exchange (IPBX), a wireless network (e.g., radio access network (RAN), 802.11 network, 802.16 network, general packet radio service (GPRS) network, HiperLAN), and/or other packet-based networks. Circuit-based networks can include, for example, the public switched telephone network (PSTN), a private branch exchange (PBX), a wireless network (e.g., RAN, Bluetooth®, code-division multiple access (CDMA) network, time division multiple access (TDMA) network, global system for mobile communications (GSM) network), and/or other circuit-based networks.

Some embodiments of the present invention may be embodied in the form of a system, a method or a computer program product. Similarly, some embodiments may be embodied as hardware, software or a combination of both. Some embodiments may be embodied as a computer program product saved on one or more non-transitory computer readable medium (or media) in the form of computer readable program code embodied thereon. Such non-transitory computer readable medium may include instructions that when executed cause a processor to execute method steps in accordance with embodiments. In some embodiments the instructions stores on the computer readable medium may be in the form of an installed application and in the form of an installation package.

Such instructions may be, for example, loaded by one or more processors and get executed. For example, the computer readable medium may be a non-transitory computer readable storage medium. A non-transitory computer readable storage medium may be, for example, an electronic, optical, magnetic, electromagnetic, infrared, or semiconductor system, apparatus, or device, or any combination thereof.

Computer program code may be written in any suitable programming language. The program code may execute on a single computer system, or on a plurality of computer systems.

One skilled in the art will realize the invention may be embodied in other specific forms without departing from the spirit or essential characteristics thereof. The foregoing embodiments are therefore to be considered in all respects illustrative rather than limiting of the invention described herein. Scope of the invention is thus indicated by the appended claims, rather than by the foregoing description, and all changes that come within the meaning and range of equivalency of the claims are therefore intended to be embraced therein.

In the foregoing detailed description, numerous specific details are set forth in order to provide an understanding of the invention. However, it will be understood by those skilled in the art that the invention can be practiced without these specific details. In other instances, well-known methods, procedures, and components, modules, units and/or circuits have not been described in detail so as not to obscure the invention. Some features or elements described with respect to one embodiment can be combined with features or elements described with respect to other embodiments.

The invention claimed is:

1. A computer-implemented method for restricting access to automotive data within a regulated automotive data distribution networked server, the method comprising:
receiving a plurality of data sharing rules from automotive data sharing regulations;
receiving data sharing restrictions applicable to at least some of the automotive data; generating a data sharing policy based on said data sharing rules and said data sharing restrictions; and
applying said data sharing policy to said automotive data to restrict one or more data consumers from accessing all or portions of said automotive data stored on said regulated automotive data distribution networked server,
wherein said automotive data sharing regulations include neutral server regulations, and wherein said regulated automotive data distribution networked server is a neutral server.

2. The method according to claim 1, wherein said data sharing restrictions are obtained and derived from data submitted by one or more data originators.

3. The method according to claim 1, wherein said automotive data sharing regulations include legislation or legal provisions.

4. The method according to claim 1, wherein said automotive data comprises data originating from one or more of: connected vehicles, road-bound infrastructure, and remote data repositories.

5. A data processing system for restricting access to automotive data within a regulated automotive data distribution networked server, the system comprising:
an automotive data distribution server having:
a policy generator configured to:
receive a plurality of data sharing rules from automotive data sharing regulations;
receive data sharing restrictions applicable to at least some of the automotive data; and,
generate a data sharing policy based on said data sharing rules and said data sharing restrictions; and,
a data sharing restrictor configured to apply said data sharing policy to said automotive data to restrict one or more data consumers from accessing all or portions of said automotive data stored on said regulated automotive data distribution networked server,
wherein said automotive data sharing regulations include neutral server regulations, and wherein said regulated automotive data distribution networked server is a neutral server.

6. The system according to claim 5, wherein said data sharing restrictions are obtained and derived from data submitted by one or more data originators.

7. The system according to claim 5, wherein said automotive data sharing regulations include legislation or legal provisions.

8. The system according to claim 5, wherein said automotive data comprises data originating from one or more of: connected vehicles, road-bound infrastructure, and remote data repositories.

9. A non-transitory computer readable storage medium for restricting access to automotive data within a regulated automotive data distribution networked server, the computer readable storage medium comprising a set of instructions that when executed cause at least one computer processor to:
receive a plurality of data sharing rules from automotive data sharing regulations;
receive data sharing restrictions applicable to at least some of the automotive data;
generate a data sharing policy based on said automotive data sharing rules and said data sharing restrictions; and
apply said data sharing policy to said automotive data to restrict one or more data consumers from accessing all or portions of said automotive data stored on said regulated automotive data distribution networked server,
wherein said automotive data sharing regulations include neutral server regulations, and wherein said regulated automotive data distribution networked server is a neutral server.

10. The non-transitory computer readable storage medium according to claim 9, wherein said data sharing restrictions are obtained and derived from data submitted by one or more data originators.

11. The non-transitory computer readable storage medium according to claim 9, wherein said automotive data sharing regulations include legislation or legal provisions.

12. The non-transitory computer readable storage medium according to claim 9, wherein said automotive data comprises data originating from one or more of: connected vehicles, road-bound infrastructure, and remote data repositories.

* * * * *